Jan. 24, 1961     R. ERICKSON     2,969,246

ANTI-DIVE MEANS IN AUTOMOTIVE VEHICLE

Filed Oct. 30, 1958

INVENTOR.
Roy Erickson
BY
Ooms, McDougall, Williams & Hersh
Attorneys

United States Patent Office 2,969,246
Patented Jan. 24, 1961

2,969,246
ANTI-DIVE MEANS IN AUTOMOTIVE VEHICLE

Roy Erickson, Box 155, Thiensville, Wis.

Filed Oct. 30, 1958, Ser. No. 770,671

6 Claims. (Cl. 280—124)

This invention relates to a device for preventing the front portion of the body of an automotive vehicle from dipping when brakes are suddenly applied.

The suspension system of modern automotive vehicles, and particularly automobiles, is designed to provide a softer, more comfortable ride for the passengers, but the resilience introduced by the suspension system between the automobile body and the wheel axles, which is necessary for the comfort of the passengers, has had an adverse effect on the braking system because a sudden application of the brakes while the car is moving even at moderate speeds may cause a substantial dip or dive in the front end of the body of the car, accompanied by a corresponding rise or lift in the rear end.

This rocking movement of the automobile body with respect to the wheel axles provides a forward shift in the center of gravity of the car and this, accompanied by the sudden rise in the rear end of the vehicle body, decreases the rear wheel braking traction. At the same time, the driver is thrown forward so that driver control is substantially reduced just when it is most needed.

If this front end dip and rear end rise of the automobile body which now occurs when the car brakes are suddenly applied could be eliminated or even reversed, the traction between the ground and the rear wheels would increase. In addition, if the front end of the car could be made to rise instead of dip upon a sudden application of the brakes, it would be easier for the driver to maintain his position so that driver control would increase during emergency braking conditions.

Mechanisms such as that described in my copending application filed concurrently herewith and entitled "Stabilizing Mechanism for Automotive Vehicle," Serial No. 770,672, now Patent No. 2,950,122, have been devised for preventing front end dipping caused either by a sudden application of the brakes while the vehicle is moving, or caused by a suddenly encountered irregularity in the road, but these mechanisms are substantially independent of the braking system of the vehicle and are not as sensitive to driver control as an anti-dip mechanism controlled by the operation of the vehicle brakes would be.

What is needed therefore, and comprises the principal object of this invention, is a mechanism for automotive vehicles which does not affect the normal operation of the vehicle suspension system and the brake mechanism, but when the brakes are suddenly applied this mechanism prevents the front end of the vehicle body from dipping and the rear end from rising.

In addition to the above-mentioned considerations, a sudden application of brakes on automotive vehicles, particularly at high speeds, may cause brake fading due to high temperatures in the brake linings. To prevent this, additional emergency braking surface would be desirable, and this is another object of this invention.

For economic reasons it would be desirable to incorporate the additional braking surface into the anti-dip mechanism, and this comprises still another object of this invention.

Still another object of this invention is to provide an anti-dip mechanism for preventing the front end of the vehicle body from dipping when the brakes are applied, which is powered by the kinetic energy of the moving vehicle.

These and other objects of this invention will become more apparent when read in the light of the accompanying drawings and specifications, wherein—

Figure 2:
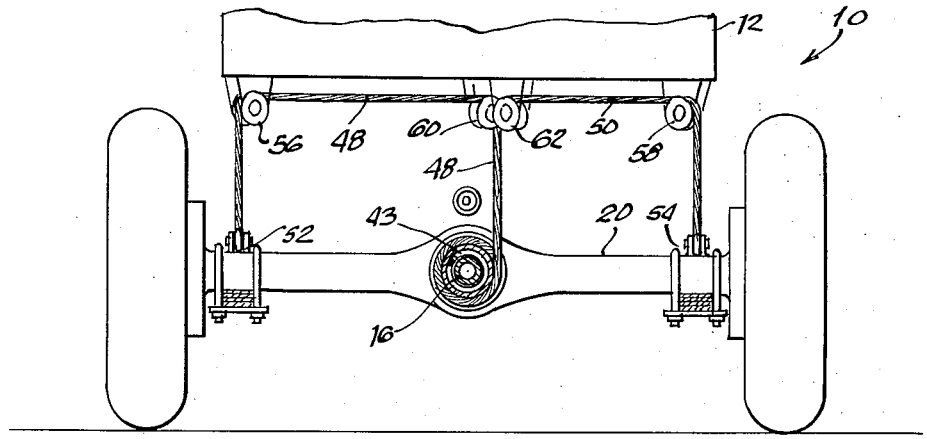
Figure 2 is a rear elevational view of the rear wheels taken on the line 2—2 of Figure 1 and looking in the direction indicated.
Figure 1:
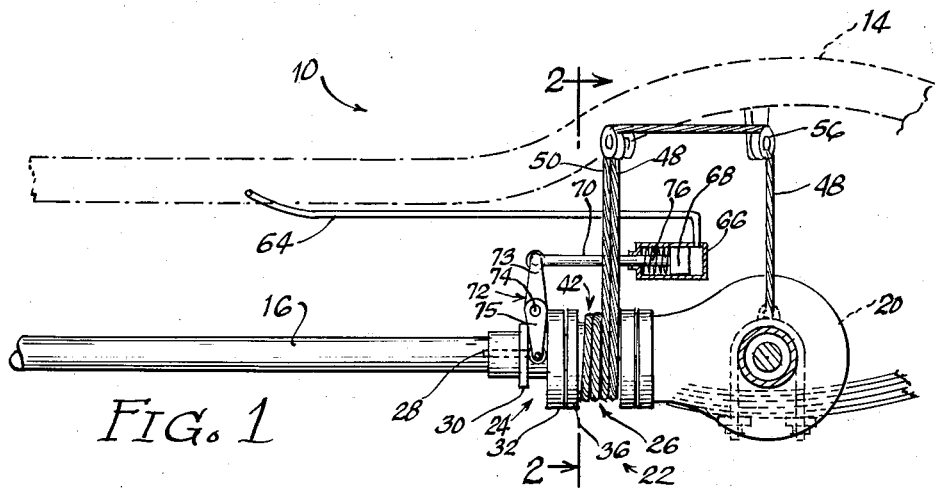
Figure 1 is a side elevational view of the drive shaft and the differential housing of an automotive vehicle with the anti-dive mechanism installed.

Referring now to Figures 1 and 2 of the drawings, an automotive vehicle indicated generally by the reference numeral 10 includes a body 12 mounted on a body frame 14. A drive shaft 16 mounted on the vehicle is connected to the differential gear assembly mounted inside the differential and axle housing 20. The vehicle has all the other parts usual in an automotive vehicle, including a conventional suspension system (not shown) which is responsible for the front end dip when the brakes are applied and a hydraulic brake mechanism.

The anti-dip mechanism is connected to the drive shaft 16 in order to use the energy of the moving vehicle in a manner described below. As shown, the anti-dip mechanism includes a friction clutch indicated generally by the reference numeral 22. The clutch consists of two members 24 and 26. Clutch member 24 is fitted over an end of drive shaft 16 and is provided with a spline or detent (not shown) which enters into an elongated groove 28 formed in the drive shaft. This arrangement permits a limited axial movement of the clutch member, but the spline and groove connection between the clutch member and drive shaft causes them to rotate together.

Figure 3:
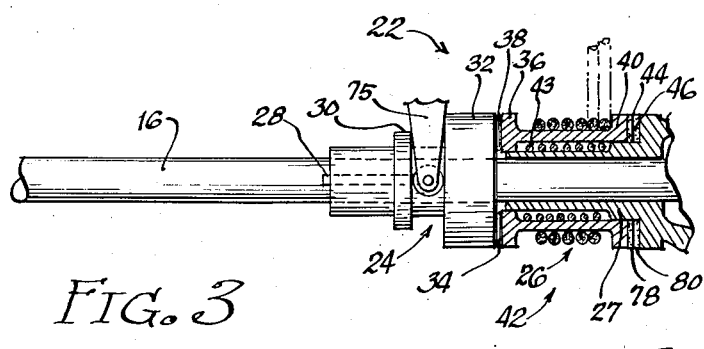
Figure 3 is an enlarged side elevational view of a portion of the drive shaft and clutch in the anti-dip mechanism.

A pair of spaced parallel flanges 30 and 32 are formed on clutch member 24 for purposes to become apparent below. These flanges have circular cross-sectional peripheries and flange 32 has a larger radius than flange 30, see Figure 3. Surface 34 on flange 32, which faces the rear of the vehicle, is the friction clutch surface and it is desirable that this surface be as large as practical to provide a more durable and effective clutching action. It is apparent that clutch member 24 will continually rotate while the vehicle is moving.

Clutch member 26 is freely and rotatably mounted on a bearing sleeve 27 forming an integrally attached extension of the axle housing 20. The drive shaft 16 is rotatably journalled in this bearing sleeve so that the clutch member 26 may be described as being freely and rotatably mounted on the drive shaft 16. As seen, clutch member 26 is provided with a first flange 36 having a diameter substantially equal to the diameter of the flange 32 on clutch member 24. The front surface 38 of flange 36 on this particular embodiment is the same size as surface 34 and is also a friction clutch surface. These clutch surfaces are in closely spaced parallel relationship to each other for operative engagement.

The rear end of clutch member 26 is provided with another flange 40 similar to flange 34 forming thereby a reel 42. The surface 44 of flange 40 opposite to clutch surface 38 is closely adjacent to or in engagement with a surface 46 formed on the front end of the differential and rear axle housing 20, and these surfaces may be roughened for reasons to become apparent below. With this arrangement, when the clutch members 24 and 26 are not coupled together, clutch member 26 will be static, but when the clutch members are coupled together, clutch member 26 will rotate.

In this particular embodiment, two steel cables 48 and 50, see Figure 2, are wound on reel 42, but embodiments of this invention are contemplated which require only one cable. One end of each cable is secured to a cable eye formed in U-bolts 52 and 54 rigidly mounted on the opposite ends of the axle housing by any convenient means. Pulleys 56 and 58 are mounted on the frame 14 of the body of the vehicle directly above the ends of the axle housing, see Figure 2. Additional pulleys 60 and 62 are located above reel 42 formed on the clutch member 26. The cables 48 and 50 pass over these pulleys as shown. In addition, as seen in Figure 2, the reel is like a conventional spring-loaded cable drum and its internal one-way wind-up spring 43, which is connected between bearing sleeve 27 and the inner surface of the reel, acts to maintain a constant tension in the cables regardless of the relative movement in the frame and drive shaft due to irregularities in the road. This is very important because any slack in the steel cables would very adversely affect the operation of the device. It is apparent that when the reel is rotated in a direction which winds up cables 48 and 50, the rear end portion 14 of the body frame and the rear axle housing will be drawn together. In practice, since the position of the rear axle is fixed by the road, the rear body frame will be forced down toward the axle housing. With this arrangement, the energy of the moving car as reflected in the rotating drive shaft 10 may then be used to wind the reel, if the clutch members are locked together.

The anti-dip or dive mechanism must operate when the brakes are applied. To do this a hydraulic fluid line 64 is provided which is connected at one end to the master cylinder in the hydraulic brake system (not shown), and at the other end the hydraulic line is connected to a cylinder 66 mounted on the body of the vehicle. A piston 68 is slidably mounted in the cylinder and the piston is provided with a stem 70 which extends out from the cylinder. A lever 72 provided with opposing arms 73 and 75 is pivotally mounted at 74 on the vehicle. As seen in Figure 2, arm 73 is pivotally connected to the free end of the piston stem 70 and the other arm 75 is forked at its end and the tines are positioned between the flanges 30 and 32 on clutch member 24. With this arrangement, when lever 72 is rotated in one direction or the other, depending on the movement of piston 68 in cylinder 66, the forked arm 75 will press against the vertical wall surfaces of flange 32 or flange 30, forcing the clutch member 24 into or out of engagement with clutch 26.

When the brakes are applied to the vehicle, fluid is pumped from the master cylinder through the hydraulic line 64 and into cylinder 66. This moves the piston toward the left, compressing restoring spring 76, and at the same time, the clutch member 24 is forced into clutching engagement with the clutch member 26. When the vehicle brake pedal is released, the restoring spring 76 displaces the piston in a direction which moves the clutch members out of engagement with each other.

It is apparent from the above disclosure that when the vehicle brakes are applied the clutch members 24 and 26 will engage each other and the engagement will cause reel 42 to rotate. The use of a friction clutch here is important because the speed of rotation of the reel will depend on the slippage between the clutch members as well as on the speed of the vehicle. If there is no slippage, reel 42 would rotate with the same angular velocity as the drive shaft, and if a non-slip clutch were used instead of the friction clutch, the result would be that the correction applied by the anti-dip mechanism would be independent of the velocity and hence independent of the braking needs of the vehicle. This means that even a light application of the vehicle brakes would be sufficient to cause the reel to rotate rapidly and wind up the cables at a speed proportional to the speed of the vehicle, thereby causing the rear end of the vehicle body to sink. This is undesirable since there are many occasions when a light momentary brake pressure is desirable without the anti-dip correction applied by this mechanism. By using a friction clutch the speed of rotation of reel 42 will depend on the magnitude of the brake pressure applied, as well as on the speed of the vehicle, so that light brake pressure will permit the clutch members 24 and 26 to slip and thus the anti-dip mechanism will have little effect.

In emergencies, however, under severe braking conditions, the hydraulic pressure in cylinder 66 will be very high and through its effect on piston 68 and lever 72 will force the clutch members tightly together. With this arrangement, slippage between the clutch members will be minimized and the reel 42 will wind up the cables 48 and 50 fast enough to prevent the front end of the vehicle body from dipping, and in fact it may even cause it to rise. Furthermore, the slip between the clutch surfaces generates heat and consequently these clutching surfaces act as an auxiliary brake to augment the standard braking system of the vehicle and thereby help prevent brake fading. Since the reel 42 is rotating with respect to the differential and axle housing, additional braking surface can be provided by roughing surfaces 44 on flange 40 and surface 46 on the differential and rear axle housing 20. Since reel 42 is freely and rotatably mounted on the drive shaft, there normally would be little frictional resistance between surfaces 44 and 46, but when a large braking pressure is applied the flange 40 on clutch 26 would be forced tightly against surface 46 so that the rotation of the reel would produce a larger frictional resistance. These surfaces could have brake linings 78 and 80 secured to them, and since emergency braking conditions are comparatively infrequent, they would probably last the lifetime of the vehicle. It is essential to note, however, that at all times the frictional resistance between surfaces 44 and 46 must be less than the frictional slip between the clutching surfaces or else the reel will either not wind or will wind up the cables too slowly to be useful.

The invention may be embodied in other forms without departing from the spirit or essential characteristics thereof as set forth in the claims, and the present embodiment is therefore to be considered as illustrative and not restrictive and it is intended to include all changes which come within the scope and range of the claims.

I claim:

1. In an automotive vehicle with a brake mechanism, a rear axle housing adjacent to the rear portion of the body frame and a drive shaft for transmitting power to the rear wheels of said vehicle, combined auxiliary braking and force-exerting means connected between the rear axle housing and the adjacent rear portion of the body frame for drawing the rear portion of the body frame closer to the rear axle housing and for supplementing the operation of the brake mechanism, means separate and apart from the brake mechanism for controlling the actuation of said brake mechanism, means connecting said combined means to the brake control means of the vehicle so that when the brake control means is operated for operation of the brakes the combined means is actuated to assist the braking mechanism and to draw the rear portion of the body frame down toward the rear axle housing and thereby prevent the front end of the body frame from dipping, said auxiliary braking and force-exerting means being drive shaft operated.

2. The apparatus set forth in claim 1 wherein said combined auxiliary braking and force-exerting means utilizes the kinetic energy of the automotive vehicle for its operation.

3. In an automotive vehicle with a rear axle housing adjacent to the rear portion of the body frame and a hydraulic brake mechanism of the kind where power is transmitted to a set of rear wheels by means of a drive shaft which drives a differential gear assembly, a clutch comprising first and second elements, the first element of the clutch mounted on the drive shaft for limited axial movement and for rotation with the drive shaft, the second element of the clutch rotatably mounted on the drive shaft, a reel coaxial with said second element and rigidly connected thereto, at least one cable wound on said reel, one end of said cable connected to the rear axle housing of the vehicle, pulley wheels mounted on the rear portion of the body frame, said cable passing over the pulley wheels, said pulley wheels positioned so when the reel is rotated in a direction which winds the cable on the reel, a force is exerted between the rear body frame and axle housing which draws the rear body frame toward the axle housing, and means connected to the hydraulic braking system of the vehicle and to said first clutch element for forcing the clutch elements together when the vehicle brakes are operated both for using the sliding and frictional engagement of the clutch elements to augment the braking surfaces of the vehicle and for causing the reel to wind up the cable and thereby prevent the front end of the body frame from dipping.

4. The apparatus set forth in claim 3 wherein said means connected to the braking system of the vehicle and to the first clutch element for forcing the clutch elements together when the brakes are applied comprise a hydraulic cylinder brake system mounted on the vehicle and connected to the hydraulic brake system, a piston movable in said cylinder in response to hydraulic pressure so that when the vehicle brakes are applied hydraulic fluid is pumped into said cylinder and said piston is moved, said piston having a portion extending out from said cylinder, a lever pivotally mounted on said vehicle and connected on one side of the lever axis to the said portion of said piston and connected on the other side of the lever axis to said first clutch element, said lever connected to said first clutch element in such a way that when the vehicle brakes are applied the displacement of said piston will pivot said lever and force the clutch elements into engagement with each other, and means biasing said first clutch element out of engagement with said second clutch element when the vehicle brakes are released.

5. The apparatus set forth in claim 3 wherein said means connected to the braking system of the vehicle and to the first clutch member for forcing the clutch members together when the brakes are applied comprise a hydraulic cylinder mounted on the vehicle and connected to the hydraulic brake system, a piston movable in said cylinder in response to hydraulic pressure so that when the vehicle brakes are applied hydraulic fluid is pumped into said cylinder and said piston is moved, said piston having a portion extending out from said cylinder, a lever pivotally mounted on said vehicle and connected on one side of the lever axis to the said portion of said piston and connected on the other side of the lever axis to said first clutch member, said lever connected to said first clutch member in such a way that when the vehicle brakes are applied the displacement of said piston will pivot said lever and force the clutch members into engagement with each other, and means biasing said first clutch member out of engagement with said second clutch member when the vehicle brakes are released.

6. In a automotive vehicle with a braking system, a rear axle housing adjacent to the rear portion of the body frame of the kind where power is transmitted to a set of rear wheels by means of a drive shaft which drive a differential gear assemly enclosed in a housing, a clutch having clutch surfaces comprising first and second members the first member of the clutch mounted on the drive shaft for limited axial movement and for rotation with the drive shaft, the second member of the clutch rotatably mounted on the drive shaft and provided with a flange in spaced parallel relation to the clutch surface defining therewith a reel, the surface of said flange opposite to said clutch surface in engagement with a surface on said differential housing, two cables wound on said reel, said reel adapted to exert a constant tension on said cables, one end of each cable secured to the opposite ends of the axle housing, pulley wheels for each cable mounted on the rear portion of the body frame, said cables passing over the pulley wheels, said pulley wheels positioned so when the reel is rotated in a direction which winds the cables force is exerted between the rear body frame and the axle housing which draws the rear body frame and axle housing toward each other, and means connected to the braking system of the vehicle and to said first clutch member for forcing the clutch members into frictional clutching engagement with each other to rotate said reel, said rotation causing the said flange surface to frictionally slide against the said surface of said differtial housing whereby the braking system of the vehicle is augmented by the energy dissipated by both surfaces of the second clutch member while the rotation of said reel winds up the cables and prevents the front end of the body frame from dipping when the brakes are applied.

References Cited in the file of this patent
UNITED STATES PATENTS

| | | |
|---|---|---|
| 2,147,082 | Beusch | Feb. 14, 1939 |
| 2,163,884 | La Brie | June 27, 1939 |
| 2,434,055 | Sauer | Jan. 6, 1948 |
| 2,564,509 | Shelton | Aug. 14, 1951 |